(12) United States Patent
Hoshina et al.

(10) Patent No.: US 9,810,959 B2
(45) Date of Patent: Nov. 7, 2017

(54) LIQUID CRYSTAL DISPLAY INCLUDING A MAINPIXEL ELECTRODE

(71) Applicant: Japan Display Inc., Minato-ku (JP)

(72) Inventors: Katsuhiro Hoshina, Kumagaya (JP); Tetsuya Iizuka, Saitama (JP); Masato Nakamura, Fukaya (JP); Kazuya Daishi, Fukaya (JP)

(73) Assignee: Japan Display Inc., Minato-ku (JP)

(*) Notice: Subject to any disclaimer, the term of this patent is extended or adjusted under 35 U.S.C. 154(b) by 182 days.

(21) Appl. No.: 14/822,534

(22) Filed: Aug. 10, 2015

(65) Prior Publication Data

US 2015/0346567 A1 Dec. 3, 2015

Related U.S. Application Data

(60) Continuation of application No. 14/631,551, filed on Feb. 25, 2015, now Pat. No. 9,140,943, which is a (Continued)

(30) Foreign Application Priority Data

Aug. 11, 2011 (JP) .................................. 2011-176090

(51) Int. Cl.
  *G02F 1/136* (2006.01)
  *G02F 1/1343* (2006.01)
  (Continued)

(52) U.S. Cl.
  CPC ...... *G02F 1/134363* (2013.01); *G02F 1/1337* (2013.01); *G02F 1/1368* (2013.01);
  (Continued)

(58) Field of Classification Search
  CPC ......... G02F 1/136286; G02F 1/136213; G02F 1/134309; G02F 2001/134318;
  (Continued)

(56) References Cited

U.S. PATENT DOCUMENTS

| 6,266,116 B1 | 7/2001 | Ohta et al. |
| 6,900,872 B2 | 5/2005 | Kang |

(Continued)

FOREIGN PATENT DOCUMENTS

| JP | 6-222397 | 8/1994 |
| JP | 7-159807 | 6/1995 |

(Continued)

OTHER PUBLICATIONS

Office Action dated May 14, 2013 in Japanese Patent Application No. 2011-176090 (with English translation).

*Primary Examiner* — Huyen Ngo
(74) *Attorney, Agent, or Firm* — Oblon, McClelland, Maier & Neustadt, L.L.P.

(57) ABSTRACT

A liquid crystal display including first and second substrates with a liquid crystal layer therebetween. The first substrate includes a semiconductor layer electrode electrically connected to a first source line on a first side of a position where the semiconductor layer intersects with a gate wire in a second direction, and to a contact portion on a second side of the position. A contact portion is arranged nearer the gate line than the main pixel electrode. The main pixel electrode extends from the contact portion in the second direction and is located nearer the second side than the first side. The contact portion is connected to the main pixel electrode only by a first portion of the main pixel electrode.

7 Claims, 11 Drawing Sheets

Related U.S. Application Data division of application No. 13/564,003, filed on Aug. 1, 2012, now Pat. No. 9,025,101.

(51) Int. Cl.
*G02F 1/1362* (2006.01)
*G02F 1/1333* (2006.01)
*G02F 1/1335* (2006.01)
*G02F 1/1368* (2006.01)
*G02F 1/139* (2006.01)
*G02F 1/1337* (2006.01)

(52) U.S. Cl.
CPC ........ *G02F 1/1395* (2013.01); *G02F 1/13439* (2013.01); *G02F 1/133345* (2013.01); *G02F 1/133512* (2013.01); *G02F 1/133528* (2013.01); *G02F 1/136277* (2013.01); *G02F 1/136286* (2013.01); *G02F 2001/134381* (2013.01); *G02F 2201/121* (2013.01)

(58) Field of Classification Search
CPC ........... G02F 1/133345; G02F 1/13439; G02F 1/136209; G02F 1/136227
See application file for complete search history.

(56) References Cited

U.S. PATENT DOCUMENTS

| | | | |
|---|---|---|---|
| 7,799,590 B2* | 9/2010 | Yamazaki | G02F 1/136213 257/344 |
| 8,772,781 B2 | 7/2014 | Hoka et al. | |
| 8,873,010 B2* | 10/2014 | Kitani | G02F 1/136 349/130 |
| 8,928,122 B2* | 1/2015 | Nagano | G02F 1/1345 257/621 |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0230399 A1 | 9/2009 | Sawamizu et al. | |
| 2013/0063692 A1* | 3/2013 | Kesho | G02F 1/134363 349/143 |
| 2013/0088660 A1 | 4/2013 | Kaneko | |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 9-230380 | 9/1997 |
| JP | 10-26765 | 1/1998 |
| JP | 10-90708 | 4/1998 |
| JP | 2003-337553 | 11/2003 |
| JP | 2005-3802 | 1/2005 |
| JP | 3644653 | 2/2005 |
| JP | 2005-242307 | 9/2005 |
| JP | 2006-243753 | 9/2006 |
| JP | 2007-516464 | 6/2007 |
| JP | 2008-26773 | 2/2008 |
| JP | 2009-98374 | 5/2009 |
| JP | 2009-192822 | 8/2009 |
| JP | 2010-243939 | 10/2010 |
| JP | 2011-100071 | 5/2011 |

* cited by examiner

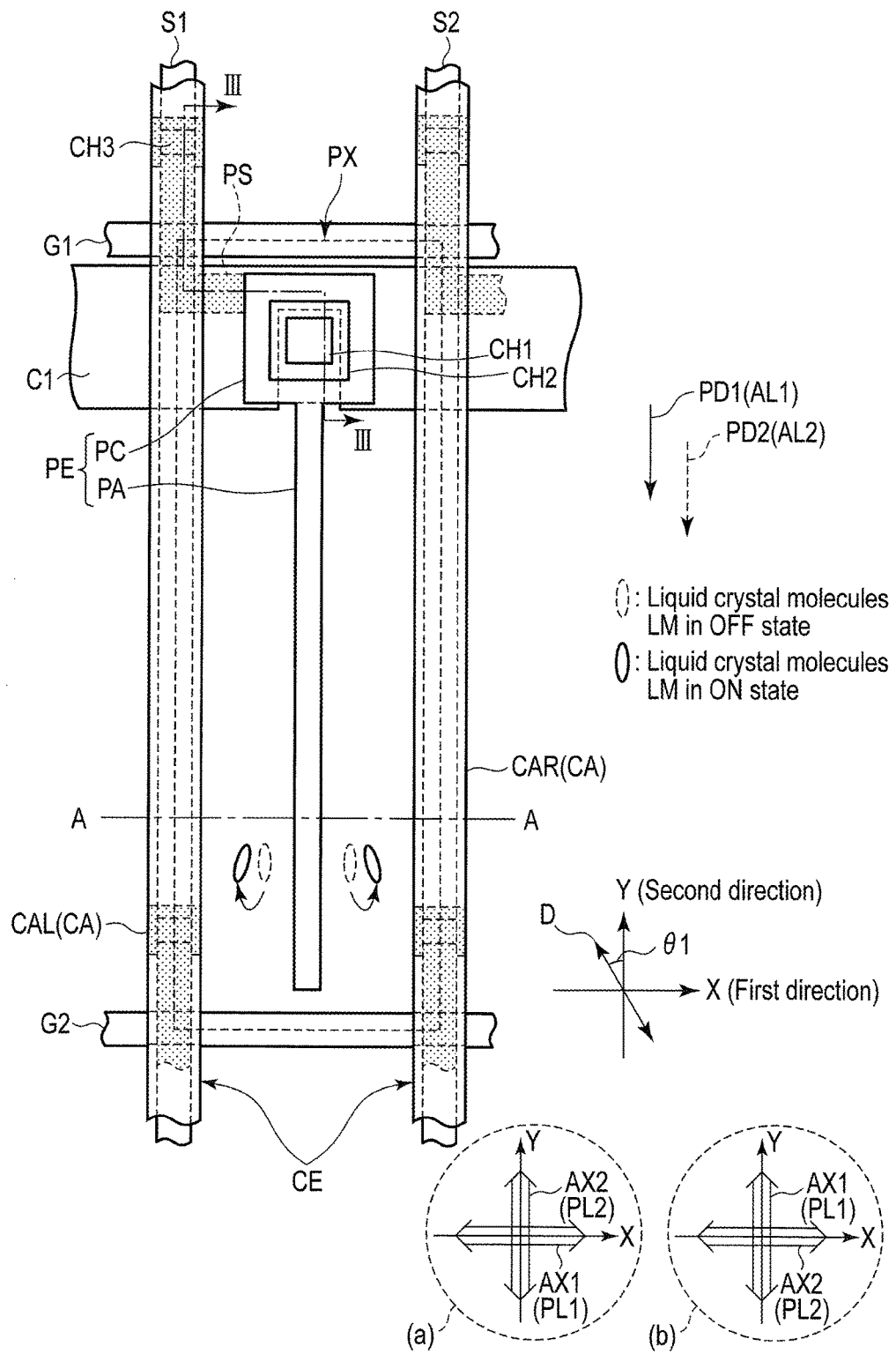
F I G. 2

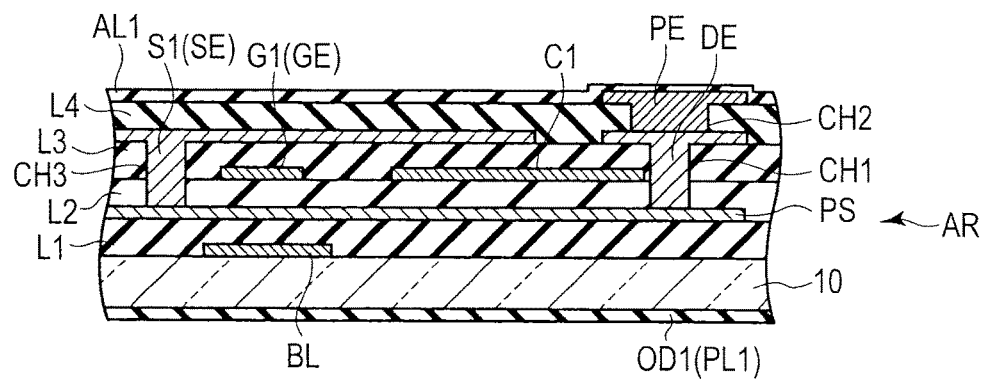
F I G. 3

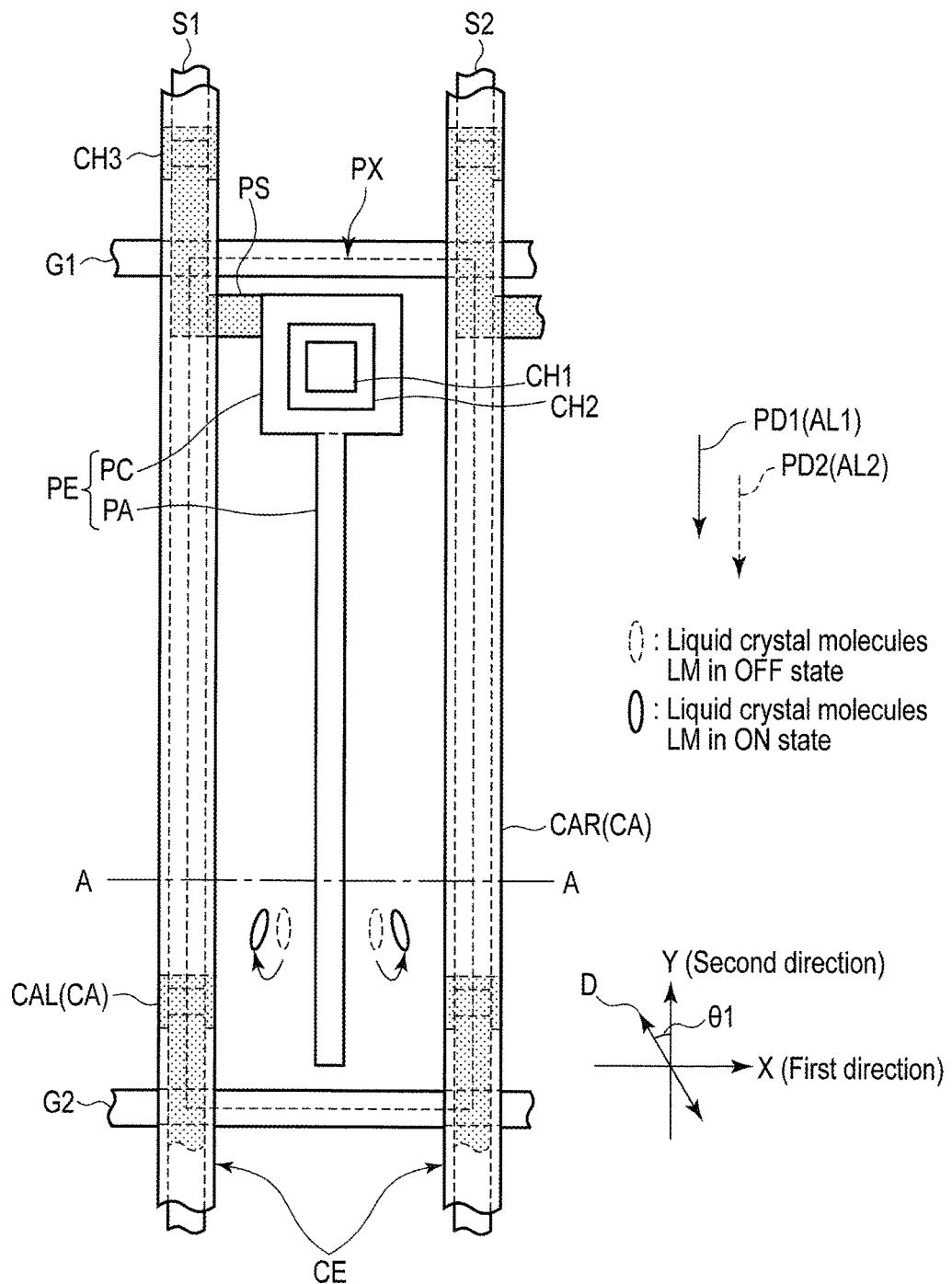
F I G. 11

LIQUID CRYSTAL DISPLAY INCLUDING A MAINPIXEL ELECTRODE

CROSS-REFERENCE TO RELATED APPLICATIONS

This application is based upon and claims the benefit of priority from Japanese Patent Application No. 2011-176090, filed Aug. 11, 2011, the entire contents of which are incorporated herein by reference.

FIELD

Embodiments described herein relate generally to a liquid crystal display.

BACKGROUND

In recent years, every effort has been made to develop flat-panel displays. In particular, liquid crystal displays have been attracting attention due to the advantages thereof such as reduced weights, thicknesses, and power consumption. In particular, in connection with active matrix liquid crystal displays in which a switching element is incorporated in each pixel, a structure that utilizes lateral electric fields (including fringe electric fields) has been gathering attention, for example, a structure based on an IPS (In-Plane Switching) mode or an FFS (Fringe Field Switching) mode. A liquid crystal display in the lateral electric field mode comprises pixel electrodes and counter electrodes formed on an array substrate and switches liquid crystal molecules using electric lateral fields that are almost parallel to the principal surface of the array substrate.

On the other hand, a technique has been proposed which switches the liquid crystal molecules by forming lateral electric fields or oblique electric fields between pixel electrodes formed on an array substrate and counter electrodes formed on a counter substrate.

BRIEF DESCRIPTION OF THE DRAWINGS

FIG. 2 is a plan view schematically showing an example of structure of one pixel in the liquid crystal display panel shown in FIG. 1 as seen from a counter substrate side;

FIG. 3 is a cross-sectional view taken along line in FIG. 2 and schematically showing a cross-sectional structure of an array substrate in the liquid crystal display shown in FIG. 2;

FIG. 11 is a plan view schematically showing another example of structure of one pixel in the liquid crystal display panel shown in FIG. 1 as seen from the counter substrate side.

DETAILED DESCRIPTION

Figure 1:
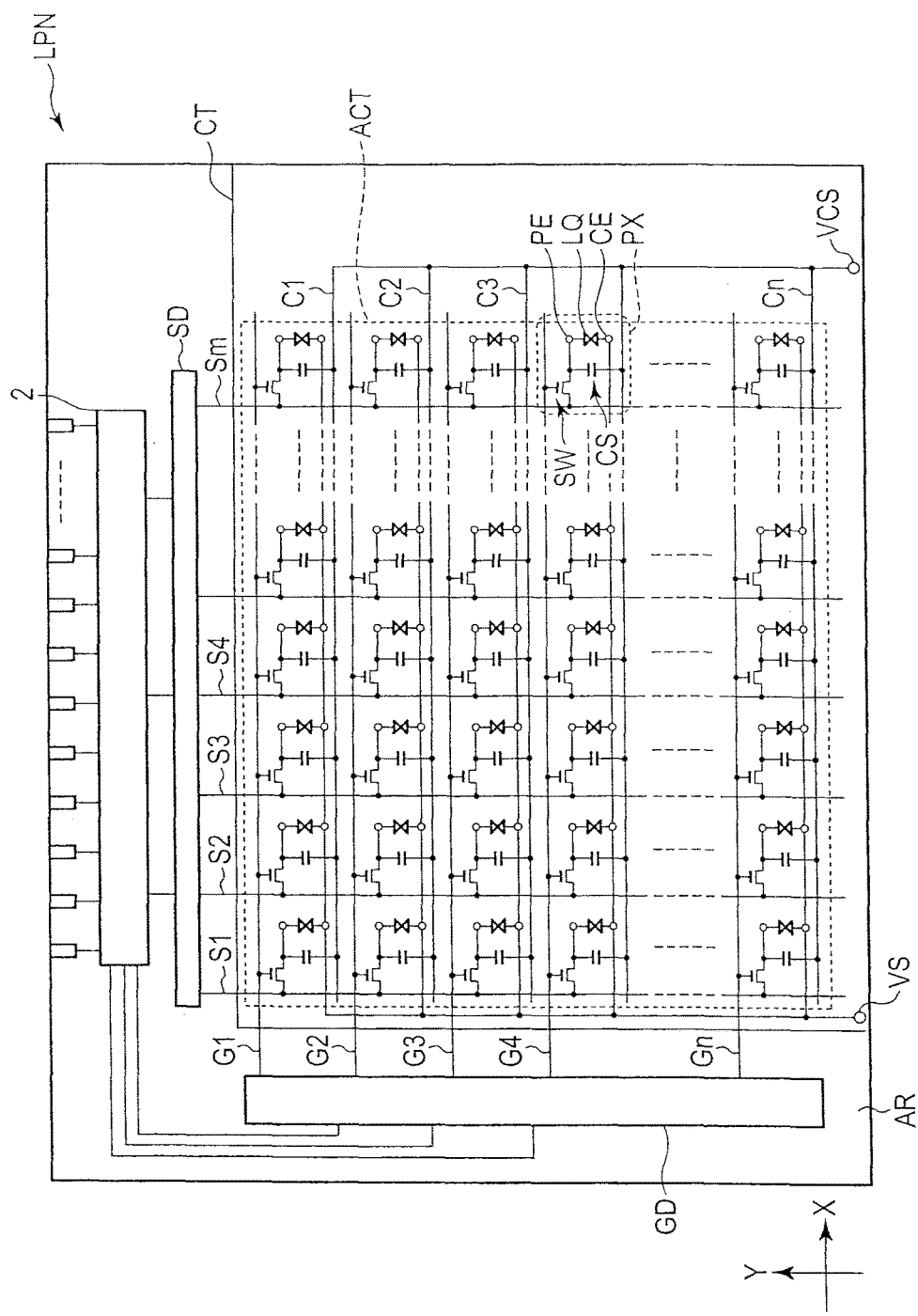
FIG. 1 is a diagram schematically showing a configuration of a liquid crystal display according to the present embodiment and an equivalent circuit.

In general, according to one embodiment, a liquid crystal display comprises a first substrate comprising a gate wire, a source wire intersecting with the gate wire, a pixel electrode with a contact portion and a main pixel electrode extending from the contact portion, and a semiconductor layer arranged under the source wire and intersecting with the gate wire and bending under the source wire so as to extend to below the contact portion; a second substrate arranged opposite the array substrate and comprising main common electrodes extending substantially parallel to the main pixel electrode on either side of the main pixel electrode; and a liquid crystal layer comprising liquid crystal molecules between the first substrate and the second substrate. The semiconductor layer is electrically connected to the source wire on one side of a position where the semiconductor layer intersects with the gate wire and to the contact portion on another side of the position where the semiconductor layer intersects with the gate wire.

The present exemplary embodiment will be described below in detail with reference to the drawings. In the figures, components providing the same or similar functions are denoted by the same reference numerals, and duplicate descriptions are omitted.

FIG. 1 is a diagram schematically showing a configuration of a liquid crystal display according to a first embodiment and an equivalent circuit.

That is, the liquid crystal display comprises a liquid crystal display panel LPN of an active matrix type. The liquid crystal display panel LPN comprises an array substrate AR that is a first substrate, a counter substrate CT that is a second substrate arranged opposite the array substrate AR, and a liquid crystal layer LQ held between the array substrate AR and the counter substrate CT. The liquid crystal display panel LPN comprises an active area ACT that displays images. The active area ACT comprises a plurality of pixels PX arranged in an m×n matrix (m and n denote positive integers).

The liquid crystal display panel LPN comprises n gate wires G (G1 to Gn), n auxiliary capacitance lines C (C1 to Cn), and m source wires S (S1 to Sm). The gate wires G and the auxiliary capacitance lines C extend substantially linearly, for example, along a first direction X. The gate wires G and the auxiliary capacitance lines C are alternately arranged in parallel in a second direction Y intersecting with the first direction X. Here, the first direction X and the second direction Y are substantially orthogonal to each other. The source wires S intersect with the gate wires G and the auxiliary capacitance lines C intersect with one another. The source wires S extend substantially linearly along the second direction Y. The gate wires G, the auxiliary lines C, and the source wires S need not necessarily extend linearly and may partly bend.

Each of the gate wires G is led out from the active area ACT and connected to a gate driver GD. Each of the source wires S is led out from the active area ACT and connected to a source driver SD. At least a part of each of the gate driver GD and the source driver SD is formed, for example, on an array substrate AR and connected to a driving IC chip 2 formed on the array substrate AR and comprising a built-in controller.

Each pixel PX comprises a switching element SW, a pixel electrode PE, and a common electrode CE. An auxiliary capacitance Cs is formed between the auxiliary capacitance line C and the pixel electrode PE. Specifically, the auxiliary capacitance Cs is formed between the auxiliary capacitance line C and a semiconductor layer PS electrically connected to the pixel electrode PE. The auxiliary capacity line C is electrically connected to a voltage application section VCS to which an auxiliary capacitance voltage is applied.

According to the present embodiment, the liquid crystal display panel LPN is configured such that the pixel electrodes PE are formed on the array substrate AR, while at least some of the common electrodes CE are formed on a counter substrate CT. Liquid crystal molecules in the liquid crystal layer LQ are switched mainly using electric fields formed between the pixel electrodes PE and the common electrodes CE. The electric fields formed between the pixel electrodes PE and the common electrodes CE are oblique electric fields slightly inclined to an X-Y plane or a principal surface of the substrate defined by the first direction X and the second direction Y (or lateral electric fields almost parallel to the principal surface of the substrate).

The switching element SW comprises, for example, an n-channel thin-film transistor (TFT). The switching element SW is electrically connected to the gate wire G and the source wire S. The switching element SW may be either of a top gate type or of a bottom gate type. Furthermore, the semiconductor layer PS in the switching element SW is formed of, for example, polysilicon but may be formed of amorphous silicon.

The pixel electrode PE is arranged in each pixel and electrically connected to the switching element SW. Each common electrode CE is arranged for the pixel electrodes in a plurality of the pixels PX via the liquid crystal layer LQ. The pixel electrodes PE and common electrodes CE are formed of a light-permeable conductive material, for example, indium tin oxide (ITO) or indium zinc oxide (IZO). However, these electrodes may be formed of any other material such as aluminum.

The array substrate AR comprises an electric feeding section VS for applying a voltage to the common electrodes CE. The electric feeding section VS is formed, for example, outside the active area ACT. The common electrodes CE are led out from the active area ACT and electrically connected to the electric feeding section VS via a conductive member (not shown in the drawings).

FIG. 2 is a plan view schematically showing an example of structure of one pixel in the liquid crystal display panel LPN shown in FIG. 1 as seen from the counter substrate side. FIG. 2 is a plan view of the pixel in an X-Y plane.

The illustrated pixel PX is shaped like a rectangle with the length thereof along the first direction X shorter than the length thereof along the second direction Y. The gate wires G1 and G2 extend along the first direction X. The auxiliary capacitance line C1 is located between the gate wire G1 and gate wire G2, which are adjacent to each other, and extends along the first direction X. The source wires S1 and S2 extend along the second direction Y. The pixel electrode PE is arranged between the source wire S1 and source wire S2, which are adjacent to each other. Furthermore, the pixel electrode PE is positioned between the gate wire G1 and the gate wire G2.

In the illustrated example, the source wire S1 is arranged at a left end of the pixel PX, and the source wire S2 is arranged at a right end of the pixel PX. Strictly speaking, the source wire S1 is located so as to stride across the boundary between the pixel PX and a pixel adjacent on the right to the pixel PX. The source wire S2 is located so as to stride across the boundary between the pixel PX and a pixel adjacent on the right to the pixel PX. The auxiliary capacitance line C1 is arranged in the vicinity of the gate wire G1 located in the upper side of the pixel PX.

In the illustrated example, the switching element SW comprises the semiconductor layer PS, electrically connected between the source wire S1 and the pixel electrode PE. The semiconductor layer PS in the switching element SW is arranged so as to extend along the source wire S1 and the auxiliary capacitance line C1 to intersect with the gate wire G1. The semiconductor layer PS is electrically connected to the source wire S1 via a contact hole CH3 on one side of a position where the semiconductor layer PS intersects with the gate wire G1. The semiconductor layer PS is electrically connected to a drain electrode DE and the pixel electrode PE via contact holes CH1 and CH2 formed in a cutout in the auxiliary capacitance line C1, on the other side of the position where the semiconductor layer PS intersects with the gate wire G1.

That is, the semiconductor layer PS extends along the source wire S1 so as to intersect with the gate wire G1. At a position where the source wire S1 and the auxiliary capacitance line C1 intersect, the semiconductor layer PS bends along the auxiliary capacitance line C1 and extends to a central portion of the pixel PX. As described above, the switching element SW is almost prevented from sticking out from an area where the switching element SW overlaps the source wire S1 and an area where the switching element SW overlaps the auxiliary capacitance line C1. This suppresses a decrease in the area of an aperture contributing to display.

FIG. 3 shows an example of a cross section of the array substrate AR taken along line in FIG. 2. The array substrate AR is formed using a light-permeable first insulating substrate 10. The semiconductor layer PS is formed on a first interlayer insulating film L1 and covered with a second interlayer insulating film L2. The gate wire G1 and the auxiliary capacitance line C1 are formed on the second interlayer insulating film L2 and covered with a third interlayer insulating film L3. The source wire S1 and the drain electrode DE of the switching element SW are formed on a third interlayer insulating film L3 and covered with a fourth interlayer insulating film L4. The pixel electrode PE is formed on the fourth interlayer insulating film L4 and covered with an orientation film AL1 described below.

The semiconductor layer PS is electrically connected to the source wire S1 (source electrode SE) and the drain electrode DE via the contact holes CH1 and CH3 formed in the third interlayer insulating film L3. The drain electrode DE is electrically connected to the pixel electrode PE via the contact hole CH2 formed in the fourth interlayer insulating film L4. The semiconductor layer PS intersects with the gate wire G1 between a position where the semiconductor layer PS is electrically connected to the drain electrode DE through the contact hole CH1 and a position where the semiconductor layer PS is electrically connected to the source wire S1 through the contact hole CH3.

At a position where the semiconductor layer PS and the gate wire G1 (gate electrode GE) intersect, a light blocking layer BL is formed like an island between the first interlayer insulating film L1 and the first insulating substrate 10. The light blocking layer BL is formed of metal such as Mo or Cu or a metal alloy. The light blocking layer BL is formed to be larger than the area in which the semiconductor layer PS and the gate wire G1 intersect, thus preventing possible light leakage.

The pixel electrode PE comprises a main pixel electrode PA and a contact portion PC which are electrically connected together (or integrated with each other). The main pixel electrode PA extends linearly along the second direction Y from the contact portion PC to the vicinity of a lower end of the pixel PX. The main pixel electrode PA is formed like a band with substantially a constant width along the first direction X. The contact portion PC is positioned in an area where the contact portion PC overlaps the auxiliary capacitance line C1. The contact portion PC is electrically connected to the semiconductor layer PS and drain electro DE of the switching element SW via the contact holes CH1 and CH2. The contact portion PC is formed to be wider than the main pixel electrode PA.

Such a pixel electrode PE is arranged at a substantially intermediate position between the source wire S1 and the source wire S2, that is, arranged in the middle of the pixel PX in the first direction X. The distance between the source wire S1 and the pixel electrode PE along the first direction X is substantially equivalent to the distance between the source wire S2 and the pixel electrode PE along the first direction X.

The common electrode CE comprises main common electrodes CA. The main common electrodes CA extend, in the X-Y plane, on either side of the main pixel electrode PA linearly along the second direction Y, which is substantially parallel to the main pixel electrode PA. Alternatively, the main common electrodes CA lie opposite the respective source wires S and extend substantially parallel to the main pixel electrode PA. The main common electrodes CA are formed like a band with substantially a constant width along the first direction X.

In the illustrated example, two main common electrodes CA are arranged parallel to each other along the first direction X and on the laterally opposite sides of the pixel PX. In following description, for distinction of these main common electrodes CA, the main common electrode in the left of FIG. 2 is denoted as CAL, and the main common electrode in the right of FIG. 2 is denoted as CAR. The main common electrode CAL lies opposite the source wire S1, and The main common electrode CAR lies opposite the source wire S2.

The main common electrodes CAL and CAR are electrically connected together inside or outside the active area. The main common electrode CAL is arranged at a left end of the pixel PX, and the main common electrode CAR is arranged at a right end of the pixel PX. Strictly speaking, the main common electrode CAL is arranged so as to stride across the boundary between the pixel PX and a pixel adjacent on the left to the pixel PX. The main common electrode CAR is arranged so as to stride across the boundary between the pixel PX and a pixel adjacent on the right to the pixel PX.

The positional relationship between the pixel electrode PE and the main common electrode CA will be focused on. The pixel electrodes PE and the main common electrodes CA are alternately arranged along the first direction X. The pixel electrodes PE and the main common electrodes CA are arranged substantially parallel to one another. In this case, none of the main common electrodes CA overlap the pixel electrodes PE in the X-Y plane.

That is, one pixel electrode PE is positioned between the main common electrode CAL and main common electrode CAR which are adjacent to each other. In other words, the main common electrode CAL and the main common electrode CAR are arranged across a position immediately above the pixel electrode PE and the either side of the pixel electrode PE. Namely, the pixel electrode PE is arranged between the main common electrode CAL and the main common electrode CAR. Thus, the main common electrode CAL, the main pixel electrode PA, and the main common electrode CAR are arranged in this order along the first direction X.

The pixel electrodes PE and the main common electrodes CE are arranged at substantially constant intervals along the first direction X. That is, the intervals between the main common electrodes CAL and the main pixel electrodes PA along the first direction X are substantially equivalent to the intervals between the main common electrodes CAR and the main pixel electrodes PA along the first direction X.

Figure 4:
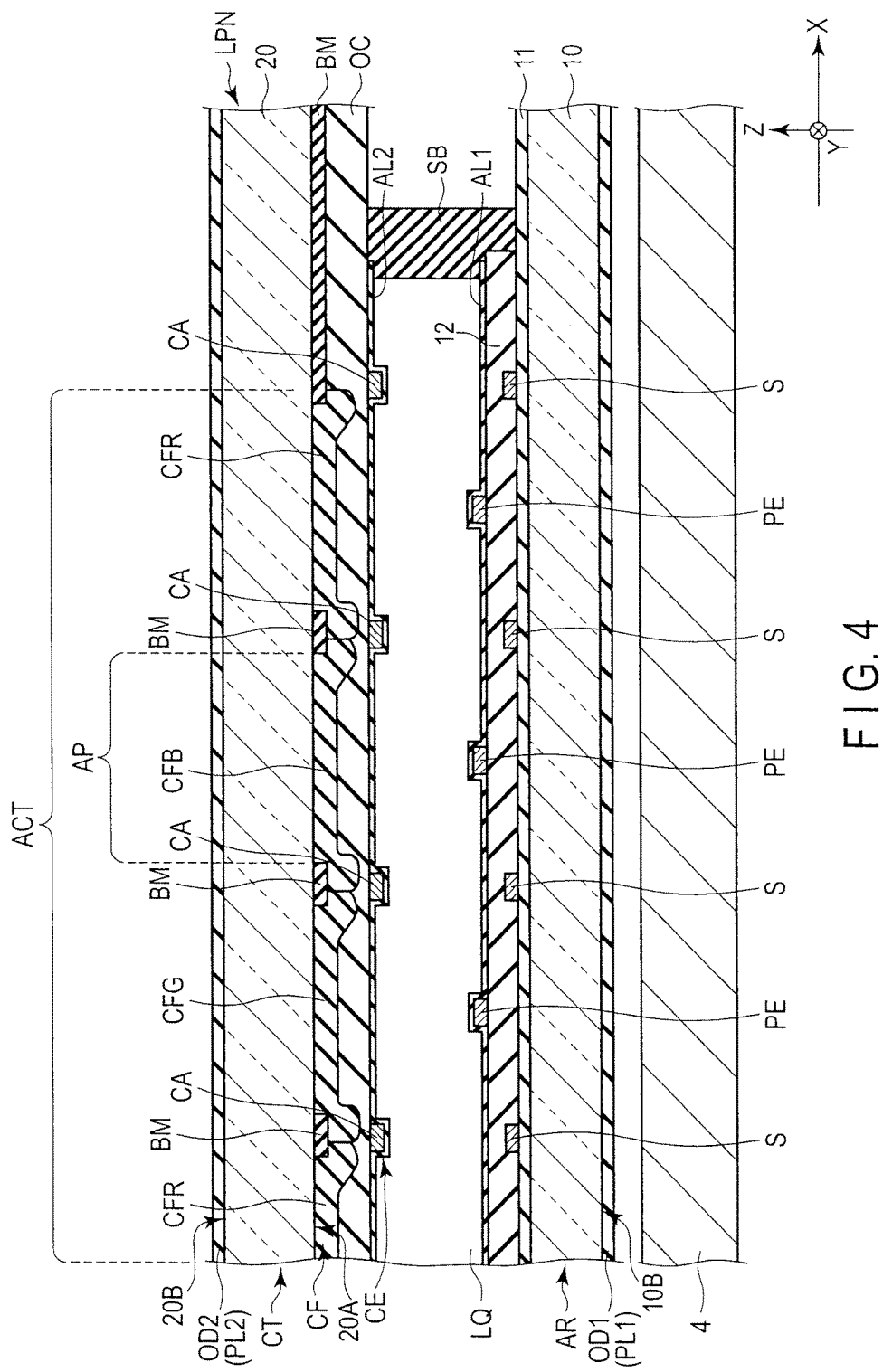
FIG. 4 is a cross-sectional view taken along line A-A in FIG. 2 and schematically showing a cross-sectional structure of the liquid crystal display panel shown in FIG. 2.

FIG. 4 is a cross-sectional view taken along line A-A in FIG. 2 and schematically showing a cross-sectional structure of the liquid crystal display panel shown in FIG. 2. FIG. 4 shows only the components required for description.

A backlight 4 is arranged on a back surface side of the array substrate AR forming the liquid crystal display panel LPN. Any of various forms of backlights $ is applicable, and any of various light sources which use a light emitting diode (LED) or a cold cathode fluorescent lamp (CCFL) is applicable. The structures of the backlight and the light source will not be described in detail.

The array substrate AR is formed using a light-permeable first insulating substrate 10. The source wires S are formed on the interlayer insulating film 11 (L1 to L3) and covered with the interlayer insulating film 12 (L4). The gate wires and auxiliary capacitance line not shown in FIG. 4 are arranged, for example, between the first insulating substrate 10 and the interlayer insulating film 11. The pixel electrodes PE are formed on the interlayer insulating film 12. Each of the pixel electrodes PE is positioned inward of a position immediately above the adjacent source wire S.

The first orientation film AL1 is arranged on a surface of the array substrate AR which is opposite to the counter substrate CT, and extends substantially all over the active area ACT. The first orientation film AL1 covers the pixel electrodes PE and the like and is also arranged on the second interlayer insulating film 12. The first orientation film AL1 is formed of a material exhibiting horizontal orientation.

The array substrate AR may further comprise some of the common electrodes CE.

The counter electrode CT is formed using a light-permeable second insulating substrate 20. The counter substrate CT comprises a black matrix BM, color filters CF, an overcoat layer OC, the common electrodes CE, and a second orientation film AL2.

The black matrix BM forms, in a partitioning manner, the pixels PX and apertures AP that are opposite to the pixel electrodes PE. That is, the black matrix BM is arranged opposite wiring sections such as the source wires S, the gate wires G, the auxiliary capacitance lines C, the contact portions PC of the pixel electrodes PE, and the switching elements SW. Here, FIG. 4 shows only a part of the black matrix BM which extends along the second direction Y. However, the black matrix BM may partly extend along the first direction X. The black matrix BM is arranged on an inner surface 20A of the second insulating substrate 20 which is opposite to the array substrate AR.

The color filters CF are arranged in association with the respective pixels PX. That is, the color filters CF are arranged at the respective apertures AP in the inner surface 20A of the second insulating substrate 20 and partly extend over the black matrix BM. The color filters CF arranged at the respective pixels PX, which are adjacent to one another in the first direction X, are in different colors. For example, the color filters CF are formed of a resin material and colored in three primary colors, red, blue, and green. Red color filters CFR formed of a resin material colored in red are arranged in association with red pixels. Blue color filters CFB formed of a resin material colored in blue are arranged in association with blue pixels. Green color filters CFG formed of a resin material colored in green are arranged in association with green pixels. The boundaries between the color filters CF are positioned so as to overlap the black matrix BM.

The overcoat layer OC covers the color filters CF. The overcoat layer OC reduces the adverse effects of recesses and protrusions on surfaces of the color filters CF.

The common electrodes CE are formed on a side of the overcoat layer OC which is opposite to the array substrate AR. The distance between the common electrodes CE and the pixel electrodes PE along a third direction Z is substantially constant. The third direction Z is a direction orthogonal to the first direction X and the second direction Y or the normal direction of the liquid crystal display panel LPN.

The second orientation film AL2 is arranged on a surface of the counter substrate CT which is opposite to the array substrate AR. The second orientation film AL2 extends substantially all over the active area ACT. The second orientation film AL2 covers the common electrodes CE, the overcoat layer OC, and the like. The second orientation film AL2 is formed of a material exhibiting horizontal orientation.

The first orientation film AL1 and the second orientation film AL2 are subjected to an orientation process (for example, a rubbing process or a photo-orientation process) in order to set initial orientation of liquid crystal molecules in the liquid crystal layer LQ. The following directions are parallel to each other and extend in the opposite directions or are parallel to each other and extend in the same direction: a first orientation process direction PD1 in which the first orientation film AL1 initially orients the liquid crystal molecules and a second orientation process direction PD2 in which the second orientation film AL2 initially orients the liquid crystal molecules. For example, the first orientation process direction PD1 and the second orientation process direction PD2 are substantially parallel to the second direction Y and extend in the same direction as shown in FIG. 2.

The above-described array substrate AR and counter substrate CT are arranged such that the first orientation film AL1 lies opposite the second orientation film AL2. In this case, for example, columnar spacers formed integrally with one of the array substrate AR and the counter substrate CT are arranged between the first orientation film AL1 on the array substrate AR and the second orientation film AL2 on the counter substrate CT. This forms a predetermined cell gap, a cell gap of, for example, 2 µm to 7 µm. The array substrate AR and the counter substrate CT are laminated together by a seal member SB located outside the active area ACT, with the predetermined cell gap formed between the substrates AR and CT.

The liquid crystal layer LQ is held in the cell gap between the array substrate AR and the counter electrode CT. The liquid crystal layer LQ is arranged between the first orientation film AL1 and the second orientation film AL2. The liquid crystal layer LQ is formed of a liquid crystal material with positive dielectric anisotropy.

A first optical element OD1 is applied, with an adhesive or the like, to an outer surface of the array substrate AR, that is, an outer surface 10B of the first insulating substrate 10 forming the array substrate AR. The first optical element OD1 is positioned opposite the back light 4 of the liquid crystal display panel LPN to control the polarization state of incident light traveling from the back light 4 into the liquid crystal display panel LPN. The first optical element OD1 includes a first polarizing plate PL1 with a first polarizing axis (or a first absorption axis) AX1.

A second optical element OD2 is applied, with an adhesive or the like, to an outer surface of the counter substrate CT, that is, an outer surface 20B of the second insulating substrate 20 forming the counter substrate CT. The second optical element OD2 is positioned on a front surface side of the liquid crystal display panel LPN to control the polarization state of exit light emitted by the liquid crystal display panel LPN. The second optical element OD2 includes a second polarizing plate PL2 with a second polarizing axis (or a second absorption axis) AX2.

The first polarizing axis AX1 of the first polarizing plate PL1 is, for example, in an orthogonal relationship (cross Nichol) with the second polarizing axis AX2 of the second polarizing plate PL2. In this case, one of the polarizing plates has the polarizing axis thereof arranged parallel to or orthogonally with the initial orientation direction of the liquid crystal molecules, that is, the first orientation process direction PD1 or the second orientation process direction PD2. If the initial orientation direction is parallel to the second direction Y, the polarizing axis of one of the polarizing plates is parallel to the second direction Y or the first direction X.

In an example shown in FIG. 2(a), the first polarizing plate PL1 is arranged such that the first polarizing axis AX1 thereof is orthogonal to the initial orientation direction (second direction Y) of the liquid crystal molecules LM (that is, parallel to the first direction X). Furthermore, the second polarizing plate PL2 is arranged such that the second polarizing axis AX2 thereof is parallel to the initial orientation direction of the liquid crystal molecules LM (that is, parallel to the second direction Y).

Furthermore, in an example shown in FIG. 2(b), the second polarizing plate PL2 is arranged such that the second polarizing axis AX2 thereof is orthogonal to the initial orientation direction (second direction Y) of the liquid crystal molecules LM (that is, parallel to the first direction X). Additionally, the first polarizing plate PL1 is arranged such that the first polarizing axis AX1 thereof is parallel to the initial orientation direction of the liquid crystal molecules LM (that is, parallel to the second direction Y).

Now, operations of the liquid crystal display panel LPN configured as described above will be described with reference to FIG. 2 and FIG. 4.

That is, when no voltage is applied to the liquid crystal layer LQ, that is, when no potential difference (or no electric field) is generated between the pixel electrode PE and the common electrode CE (OFF state), the liquid crystal molecules LM in the liquid crystal layer LQ are orientated such that the major axis thereof is directed toward the first orientation process direction PD1 of the first orientation film AL1 and the second orientation process direction PD2 of the second orientation film AL2. The OFF state corresponds to the initial orientation state, and the orientation direction of the liquid crystal molecules LM in the OFF state corresponds to the initial orientation direction.

Strictly speaking, the liquid crystal molecules LM are not always oriented parallel to the X-Y plane but are often pre-tilted. Thus, in this case, the initial orientation direction of the liquid crystal molecules LM corresponds to the major axis of the liquid crystal molecules LM in the OFF state orthographically projected on the X-Y plane. For simplification of description, it is hereinafter assumed that the liquid crystal modules LM are oriented parallel to the X-Y plane and rotate in a plane that is parallel to the X-Y plane.

In this case, the first orientation process direction PD1 and the second orientation process direction PD2 are both substantially parallel to the second direction Y. In the OFF state, as shown by a dashed line in FIG. 2, each of the liquid crystal molecules LM has the major axis thereof initially oriented substantially parallel to the second direction Y. That is, the initial orientation direction of each liquid crystal module LM is parallel to the second direction Y (or zero degree to the second direction Y).

As is the case with the illustrated example, if the first orientation process direction PD1 and the second orientation process direction PD2 are parallel to each other and extend in the same direction, then in a cross section of the liquid crystal layer LQ, the liquid crystal molecules LM is oriented in a substantially horizontal direction (a pre-tilt angle is substantially zero), in the vicinity of an intermediate portion of the liquid crystal layer LQ. Then, in the vicinity of the first orientation film AL1 and in the vicinity of the second orientation film AL2, the liquid crystal molecules are oriented at such a pre-tilt angle that the liquid crystal molecules in these vicinities are symmetric with respect to the above-described intermediate portion (splayed orientation).

Here, the first orientation film AL1 oriented in the first orientation process direction PD1 results in the initial orientation, in the first orientation process direction PD1, of the liquid crystal molecules LM in the vicinity of the first orientation film AL1. The second orientation film AL2 oriented in the second orientation process direction PD2 results in the initial orientation, in the second orientation process direction PD2, of the liquid crystal molecules LM in the vicinity of the second orientation film AL2. If the first orientation process direction PD1 and the second orientation process direction PD2 are parallel to each other and extend in the same direction, the liquid crystal molecules LM are arranged in a splayed orientation. Furthermore, as described above, the following orientations are symmetric with respect to the intermediate portion of the liquid crystal layer LQ in the vertical direction: the orientation of the liquid crystal molecules LM in the vicinity of the first orientation film AL1 on the array substrate AR and the orientation of the liquid crystal molecules LM in the vicinity of the second orientation film AL2 on the counter substrate AR. Thus, optical compensation is provided even in a direction inclined to the normal direction of the substrate. Therefore, if the first orientation process direction PD1 and the second orientation process direction PD2 are parallel to each other and extend in the same direction, black display involves reduced light leakage and a high contrast ratio can be achieved. As a result, display quality can be improved.

If the first orientation process direction PD1 and the second orientation process direction PD2 are parallel to each other and extend in the opposite directions, then in a cross section of the liquid crystal layer LQ, the liquid crystal molecules LM are oriented at a substantially uniform pre-tilt angle in the vicinity of the first orientation film AL1, in the vicinity of the second orientation film AL2, and in the intermediate portion of the liquid crystal layer LQ (homogenous orientation).

Back light from the backlight 4 partly passes through the first polarizing plate PL1 into the liquid crystal display panel LPN. The polarizing state of the light having entered the liquid crystal display panel LPN varies depending on the orientation state of the liquid crystal molecules LM observed when the light passes through the liquid crystal layer LQ. In the OFF state, the light having passed through the liquid crystal layer LQ is absorbed by the second polarizing plate PL2 (black display).

On the other hand, when a voltage is applied to the liquid crystal layer LQ, that is, when a potential difference (or electric fields) is generated between the pixel electrode PE and the common electrode CE (ON state), lateral electric fields (or oblique electric fields) that are substantially parallel to the substrate are generated between the pixel electrode PE and the common electrode CE. The liquid crystal molecules LM are affected by the electric fields and have the major axes thereof rotated in a plane substantially parallel to the X-Y plane as shown by a solid line in FIG. 2.

In the example shown in FIG. 2, the liquid crystal molecules LM in the area between the pixel electrode PE on the array substrate AR and the main common electrode CAL on the counter substrate CT are rotated clockwise with respect to the second direction Y and oriented toward the lower left side of FIG. 2. The liquid crystal molecules LM in the area between the pixel electrode PE and the main common electrode CAR are rotated counterclockwise with respect to the second direction Y and oriented toward the lower right of FIG. 2.

As described above, in each pixel PX, when electric fields are generated between the pixel electrode PE and the common electrode CE, the liquid crystal molecules LM are oriented in a plurality of directions at a position which overlaps the pixel electrode PE and which serves as a boundary. Domains are formed in the respective orientation directions. That is, a plurality of domains are formed in one pixel PX.

In the ON state, back light traveling from the backlight 4 into the liquid crystal display panel LPN partly passes through the first polarizing plate PL1 into the liquid crystal display panel LPN. The back light having entered the liquid crystal layer LQ has the polarizing state thereof changed. In the ON state, at least part of the light having passed through the liquid crystal layer LQ is transmitted through the second polarizing plate PL2 (white display).

Figure 5:
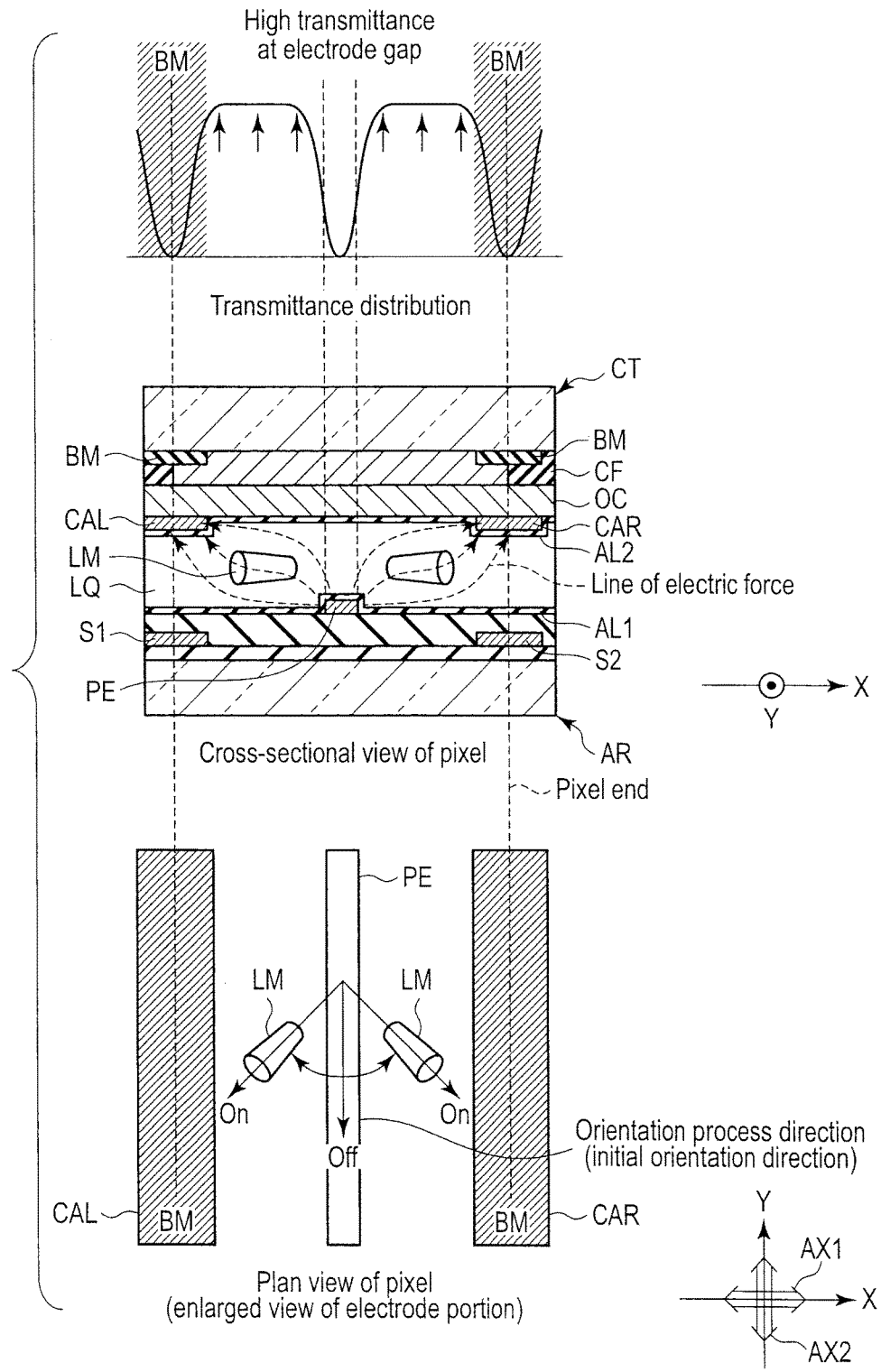
FIG. 5 is a diagram illustrating electric fields generated between a pixel electrode and a common electrode in the liquid crystal display panel shown in FIG. 2, and the relationship between transmittance and a director of each liquid crystal molecule based on the electric fields.

FIG. 5 is a diagram illustrating electric fields generated between the pixel electrode PE and common electrode CE in the liquid crystal display panel LPN shown in FIG. 2, and the relationship between transmittance and a director of each of the liquid crystal molecules LM based on the electric fields.

In the OFF state, the liquid crystal molecules LM are initially oriented substantially parallel to the second direction Y. In the ON state in which a potential difference is generated between the pixel electrode PE and the common electrodes CE, an optical modulation rate for the liquid crystals is highest (that is, the rate of transmission through the aperture is greatest) when the director of each of the liquid crystal molecules LM (or the direction of the major axis of the liquid crystal molecule LM) is displaced, in the X-Y plane, by about 45° from the first polarizing axis AX1 of the first polarizing plate PL1 and the second polarizing axis AX2 of the second polarizing plate PL2.

In the illustrated example, in the ON state, the director of the liquid crystal molecule LM between the main common electrode CAL and the pixel electrode PE is substantially parallel to an orientation of 45° or −225° in the X-Y plane. The director of the liquid crystal molecule LM between the main common electrode CAR and the pixel electrode PE is substantially parallel to an orientation of 135° or −315° in the X-Y plane. Then, a peak transmittance is obtained. Now, the distribution of transmittance per pixel will be focused on. Then, the transmittance is substantially zero over the pixel electrode PE and over the common electrode CE. On the other hand, a high transmittance is obtained all over the electrode gap between the pixel electrode PE and the common electrode CE.

The main common electrode CAL positioned immediately above the source wire S1 and the main common electrode CAR positioned immediately above the source wire S2 lie opposite to the black matrix BM. However, the main common electrodes CAL and CAR both have a width equal to or smaller than the width of the black matrix BM along the first direction X. Thus, the main common electrodes CAL and CAR are prevented from extending toward the pixel electrode PE beyond the positions where the main common electrodes CAL and CAR overlap the black matrix BM. Thus, the aperture contributing to display per pixel corresponds to the area between the pixel electrode PE and the main common electrode CAL and the area between the pixel electrode PE and the main common electrode CAR which areas are covered by the area in each cell of the black matrix BM or between the source wire S1 and the source wire S2.

The present embodiment described above enables a decrease in transmittance to be suppressed. This enables degradation of the display quality to be suppressed.

Furthermore, the present embodiment provides a high transmittance in the electrode gap between the pixel electrode PE and the common electrode CE. Thus, the inter-electrode distance between the pixel electrode PE and each of the main common electrodes CAL and CAR can be increased in order to make the transmittance per pixel sufficiently high. Additionally, for a product specification with a different pixel pitch, such a peak condition for the distribution of transmittance as shown in FIG. 5 may be utilized by changing the inter-electrode distance (that is, changing the arrangement position of the main common electrode CA with respect to the pixel electrode PE arranged substantially in the center of the pixel PX). That is, in a display mode according to the present embodiment, product specifications ranging from those having relatively large pixel pitches and low resolutions to those having relatively small pixels pitch and high resolutions do not necessarily require fine processing of electrodes. Products with various pixel pitches can be provided by appropriately setting the inter-electrode distance. Thus, demands for a high transmittance and a high resolution can be easily met.

Furthermore, according to the present embodiment, as shown in FIG. 5, the distribution of transmittance in areas involving an overlap with the black matrix BM indicates a sufficiently reduced transmittance. This is because electric fields are prevented from leaking beyond the position of the common electrode CE in the pixel and because no unwanted lateral electric field is generated in the pixels adjacent to each other across the black matrix BM, so that the liquid crystal molecules in the areas where the common electrode overlaps the black matrix BM are kept in the initial orientation state as in the case of the OFF state (or in the black display state). Thus, even if the color of the color filter varies between the adjacent pixels, the colors can be restrained from being mixed together. This enables degradation of color reproducibility and a decrease in contrast ratio to be suppressed.

Furthermore, when the array substrate AR and the counter substrate CT are misaligned with each other, in the first direction X, the distance between the pixel electrode PE and one of the common electrodes CE arranged on the either side of the pixel electrode PE may differ from the distance between the pixel electrode PE and the other common electrode CE. However, such misalignment occurs in all the pixels PX, and thus the distribution of electric fields does not vary among the pixels PX. Hence, the adverse effect of the misalignment on image display is minimized. Furthermore, even if the array substrate AR and the counter substrate CT are misaligned with each other, unwanted leakage of electric fields to the adjacent pixels can be suppressed. Thus, even if the color of the color filter varies between the adjacent pixels, possible color mixture can be suppressed, enabling degradation of color reproducibility and a decrease in contrast ratio to be restrained.

Furthermore, according to the present embodiment, each of the main common electrodes CA lies opposite the source wire S. In particular, the aperture AP may be larger if the main common electrodes CAL and CAR are arranged immediately above the source wires S1 and S2, respectively, than if the main common electrodes CAL and CAR are arranged closer to the pixel electrode PE than the source wires S1 and S2, respectively. Thus, the transmittance of the pixel PX can be increased if the main common electrodes CAL and CAR are arranged immediately above the source wires S1 and S2, respectively.

Additionally, arranging the main common electrodes CAL and CAR immediately above the source wires S1 and S2, respectively, enables an increase in the inter-electrode distance between the pixel electrode PE and each of the common electrodes CAL and CAR. Thus, lateral electric fields that are closer to horizontal electric fields can be formed. This enables maintenance of increased viewing angle, which is an advantage of, for example, an IPS mode, which corresponds to a conventional configuration.

In addition, the present embodiment enables a plurality of domains to be formed in a single pixel. As a result, the viewing angle can be optically compensated for in a plurality of directions and thus increased.

In the above-described example, the initial orientation direction of the liquid crystal molecules LM is parallel to the second direction Y. However, as shown in FIG. 2, the initial orientation direction of the liquid crystal molecules LM may be an oblique direction D that obliquely intersects with the second direction Y. Here, an angle θ1 between the initial orientation direction D and the second direction Y is larger than 0° and smaller than 45°. An angle θ1 of about 5° to 30° and more desirably at most 20° is very effective in controlling the orientation of the liquid crystal molecules LM. That is, the initial orientation direction of the liquid crystal molecules LM is desirably substantially parallel to a direction that is between 0° and 20° to the second direction Y.

Furthermore, in the above-described example, the liquid crystal layer LQ is formed of the liquid crystal material with the positive dielectric anisotropy. However, the liquid crystal layer LQ may be formed of a liquid crystal material with negative dielectric anisotropy. However, for the liquid crystal material with the negative dielectric anisotropy, which is opposite to the dielectric anisotropy of the above-described liquid crystal material, the angle θ1 is preferably between 45° and 90° and desirably at least 70°. This will not be described in detail.

Even in the ON state, almost no lateral electric fields are generated over the pixel electrodes PE or the common electrodes CE (or electric fields sufficient for driving the liquid crystal molecules LM are not generated). Consequently, the liquid crystal molecules LM are almost immovable from the initial orientation direction as in the case of the OFF state. Thus, even if the pixel electrodes PE and the common electrodes CE are formed of a light-permeable conductive material such as ITO, the back light is almost prevented from passing through these areas and thus from contributing to display even in the ON state. Therefore, the pixel electrodes PE and the common electrodes CE need not necessarily be formed of a transparent conductive material but may be formed of a conductive material such as aluminum, solver, or copper.

Now, a liquid crystal display apparatus according to a second embodiment will be described with reference to the drawings. In the description below, components similar to those in the above-described first embodiment are denoted by the same reference numerals and will not be described below.

Figure 6:
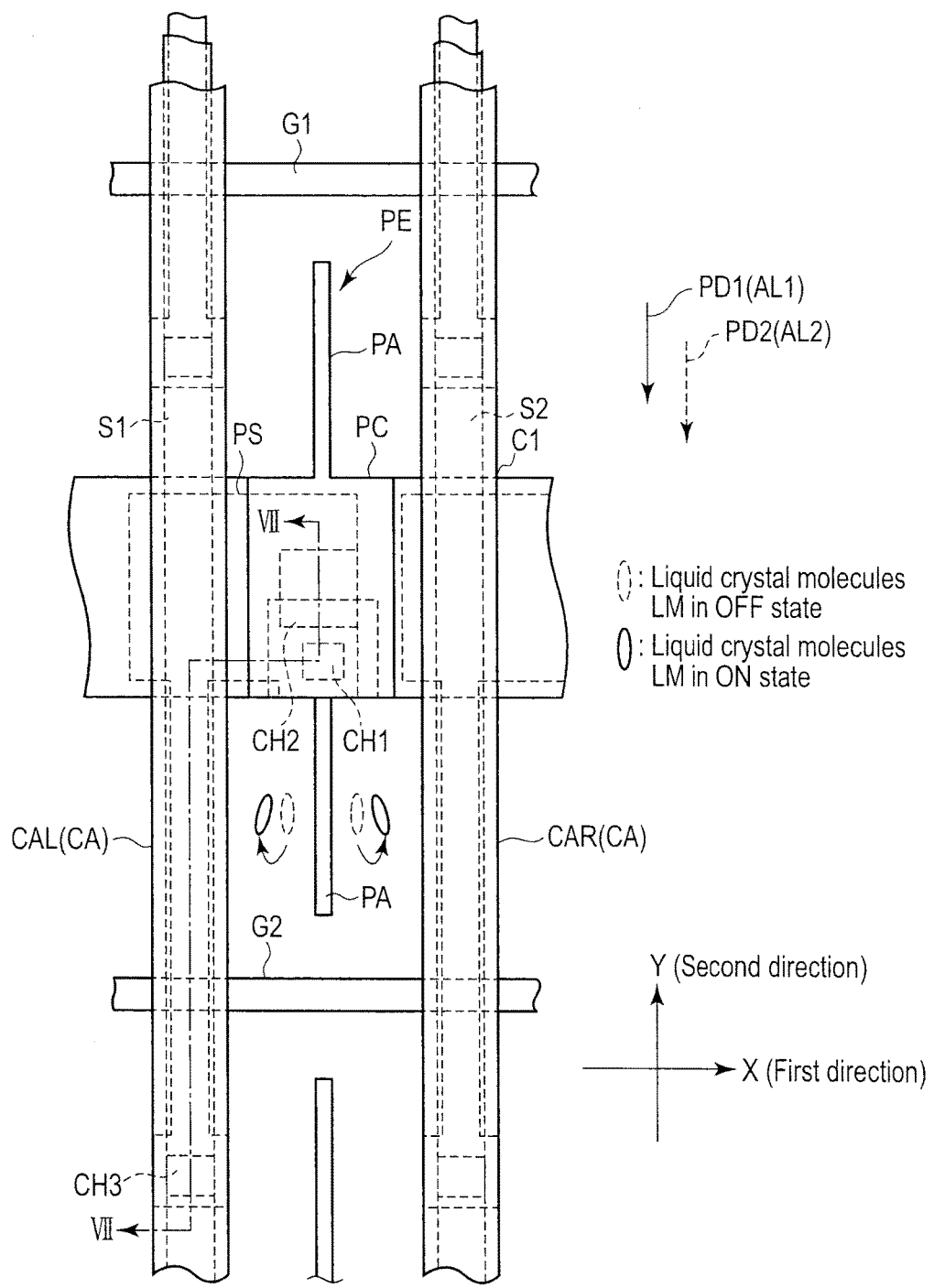
FIG. 6 is a plan view schematically showing another example of structure of one pixel in the liquid crystal display panel shown in FIG. 1 as seen from the counter substrate.

FIG. 6 is a plan view schematically showing another example of structure of one pixel PX in which the liquid crystal display panel LPN shown in FIG. 1 is viewed from the counter substrate.

This structure example is different from the structure example shown in FIG. 2 in that the auxiliary capacitance line C is arranged in the central portion of the pixel PX in the second direction Y. The central portion of the pixel PX in the second direction Y is such that the distance between the central portion and the gate wire G1 is substantially equal to the distance between the central portion and the gate wire G2.

That is, the pixel electrode PE comprises the main pixel electrode PA and contact portion PC electrically connected together (or integrated together). The main pixel electrode PA extends along the second direction Y linearly from the contact portion PC to the vicinity of the upper end or lower end of the pixel PX. The main pixel electrode PA is formed like a band with a substantially uniform width along the first direction X. The contact portion PC is arranged in an area where the contact portion PC overlaps the auxiliary capacitance line C1, that is, in the central portion of the pixel PX in the second direction Y. The main pixel electrode PA extends toward each of the gate wires G1 and G2. The contact portion PC is electrically connected to the semiconductor layer PS and drain electrode DE of the switching element SW via the contact holes CH1 and CH2. The contact portion PC is formed to be wider than the main pixel electrode PA.

The pixel electrode PE is arranged substantially at an intermediate position between the source wire S1 and the source wire S2, that is, in the center of the pixel PX in the first direction X. The distance between the source wire S1 and the pixel electrode PE along the first direction X is substantially equal to the distance between the source wire S2 and the pixel electrode PE along the first direction X.

The positional relationship between the pixel electrode PE and the common electrode CE will be focused on. The main pixel electrodes PA and the main common electrodes CA are alternately arranged along the first direction X. That is, one main pixel electrode PA is positioned between the main common electrode CAL and main common electrode CAR which are adjacent to each other. The main common electrode CAL, the main pixel electrode PA, and the main common electrode CAR are arranged in this order along the first direction X.

In the illustrated example, the switching element SW comprises the semiconductor layer PS electrically connected to the source wire S1. The semiconductor layer PS of the switching element SW extends along the source wire S1 and the auxiliary capacitance line C1. The semiconductor layer PS is electrically connected to the drain electrode DE and the pixel electrode PE via the contact holes CH1 and CH2 formed in cutouts obtained by partly removing the auxiliary capacitance line C1.

The switching element SW is provided in an area where the switching element SW overlaps the source wire E1 and in an area where the switching element SW overlaps the auxiliary capacitance line C1. That is, the semiconductor layer PS extends along the source wire S1 so as to intersect with the gate wire G2. The semiconductor layer PS bends along the auxiliary capacitance line C1 at a position where the source wire S1 and the auxiliary capacitance line C1 intersect, and extends to the central portion of the pixel PX. As described above, the switching element SW is almost prevented from sticking out from the area where the switching element SW overlaps the source wire S1 and the area where the switching element SW overlaps the auxiliary capacitance line C1. This suppresses a decrease in the area of the aperture contributing to display.

Figure 7:
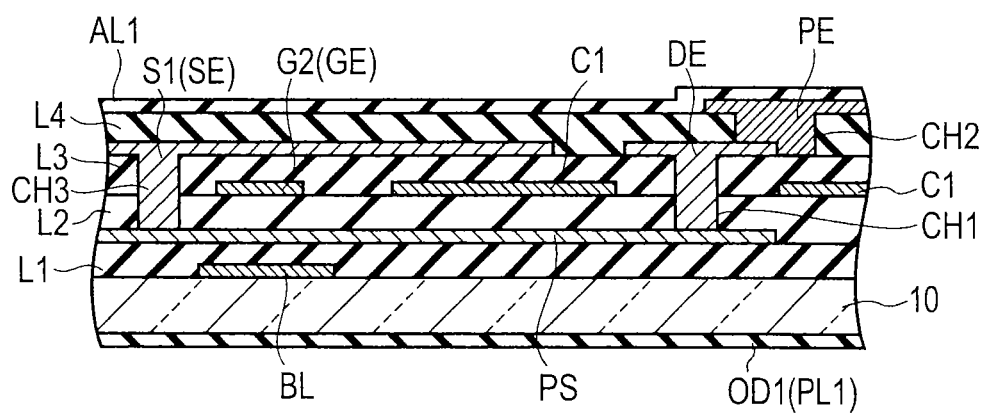
FIG. 7 is a cross-sectional view taken along line VII-VII in FIG. 6 and schematically showing a cross-sectional structure of an array substrate in the liquid crystal display panel shown in FIG. 6.

FIG. 7 shows an example of a cross section of the array substrate AR taken along line VII-VII shown in FIG. 6. The array substrate AR is formed using the light-permeable first insulating substrate 10. The semiconductor layer PS is formed on the first interlayer insulating film L1 and covered with the second interlayer insulating film L2. The gate wire G2 and the auxiliary capacitance line C1 are formed on the second interlayer insulating film L2 and covered with the third interlayer insulating film L3. The source wire S1 and the drain electrode DE of the switching element SW are formed on the third interlayer insulating film L3 and covered with the fourth interlayer insulating film L4. The pixel electrode PE is formed on the fourth interlayer insulating film L4 and covered with the orientation film AL1 described below.

The semiconductor layer PS is electrically connected to the source wire S1 (source electrode SE) and the drain electrode DE via the contact holes CH1 and CH3 formed in the second interlayer insulating film L2 and the third interlayer insulating film L3. The drain electrode DE is electrically connected to the pixel electrode PE via the contact hole CH2 formed in the fourth interlayer insulating film L4.

A light blocking layer BL is arranged between the first interlayer insulating film L1 and the first insulating substrate 10 at a position where the semiconductor layer PS and the gate wire G2 (gate electrode GE) intersect. The light blocking layer BL is formed to be larger than the area where the semiconductor layer PS and the gate wire G1 intersect. This prevents possible optical leakage.

In the example shown in FIG. 6, the semiconductor layer PS is arranged along the source wire S1 so as to intersect with the lower illustrated gate wire G2. However, the semiconductor layer PS may be arranged so as to intersect with the upper illustrated gate wire G1. Moreover, the semiconductor layer PS of the switching element SW arranged in one of the pixels PX that are adjacent to each other in the first direction X may be located so as to intersect with the lower illustrated gate wire G2. The semiconductor layer PS of the switching element SW arranged in the other pixel PX may be located so as to intersect with the upper illustrated gate wire G1. Arranging the semiconductor layer PS as described above enables a video signal supplied to the pixels PX that are adjacent to each other in the first direction X to be inverted in polarity between the pixels PX.

In such a structure example, the liquid crystal molecules LM initially oriented in the second direction Y in the OFF state are affected by electric fields generated between the pixel electrode PE and the common electrode CE in the ON state. The major axis of each of the liquid crystal molecules LM rotates in a plane that is substantially parallel to the X-Y plane, as shown by a solid line in FIG. 6.

That is, the liquid crystal molecules LM in the area between the pixel electrode PE and the main common electrode CAL are rotated clockwise with respect to the second direction Y and oriented toward the lower left side of FIG. 6. The liquid crystal molecules LM in the area between the pixel electrode PE and the main common electrode CAR are rotated counterclockwise with respect to the second direction Y and oriented toward the lower right side of FIG. 6.

As described above, in each pixel PX, when electric fields are generated between the pixel electrode PE and the common electrode CE, the liquid crystal molecules LM are oriented in a plurality of directions at a position which overlaps the pixel electrode PE and which serves as a boundary. Domains are formed in the respective orientation directions. That is, a plurality of domains are formed in one pixel PX.

The liquid crystal display according to the present embodiment is similar to the liquid crystal display according to the above-described first embodiment except for the above-described configuration, and can exert effects similar to the effects of the first embodiment. That is, the present embodiment enables a decrease in transmittance to be suppressed. This enables degradation of display quality to be suppressed.

Figure 8:
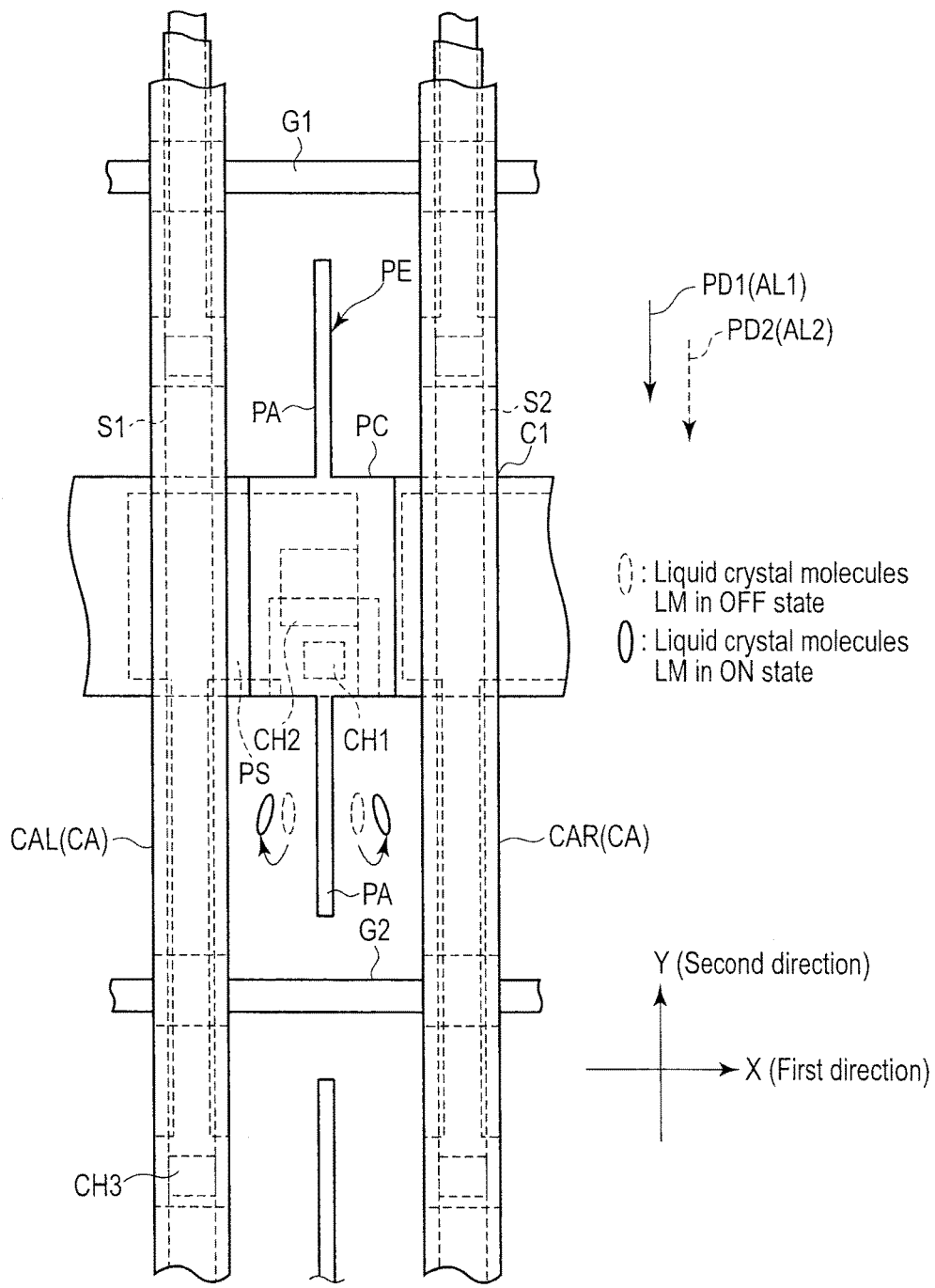
FIG. 8 is a plan view schematically showing another example of structure of one pixel in the liquid crystal display panel shown in FIG. 1 as seen from the counter substrate side.

FIG. 8 is a plan view schematically showing another example of the structure of one pixel in which the liquid crystal display panel LPN shown in FIG. 1 is viewed from the counter substrate.

This structure example is different from the structure example shown in FIG. 7 in that the width of the gate wire G in the second direction Y is larger in portions of the gate wire G in which the semiconductor layer PS and the gate wire G intersect than in the other portions of the gate wire G.

That is, according to the present embodiment, portions of the gate wire G which corresponds to the gate electrodes GE are wider, in the second direction Y, than the other portions of the gate wire G. This avoids a decrease in aperture area caused by the increased width of the gate wire G, while maintaining the channel length L of the switching element SW at a predetermined magnitude.

That is, the present embodiment enables a decrease in transmittance to be suppressed without degrading performance of the switching element SW. Thus, the display quality can be restrained from being degraded.

Figure 9:
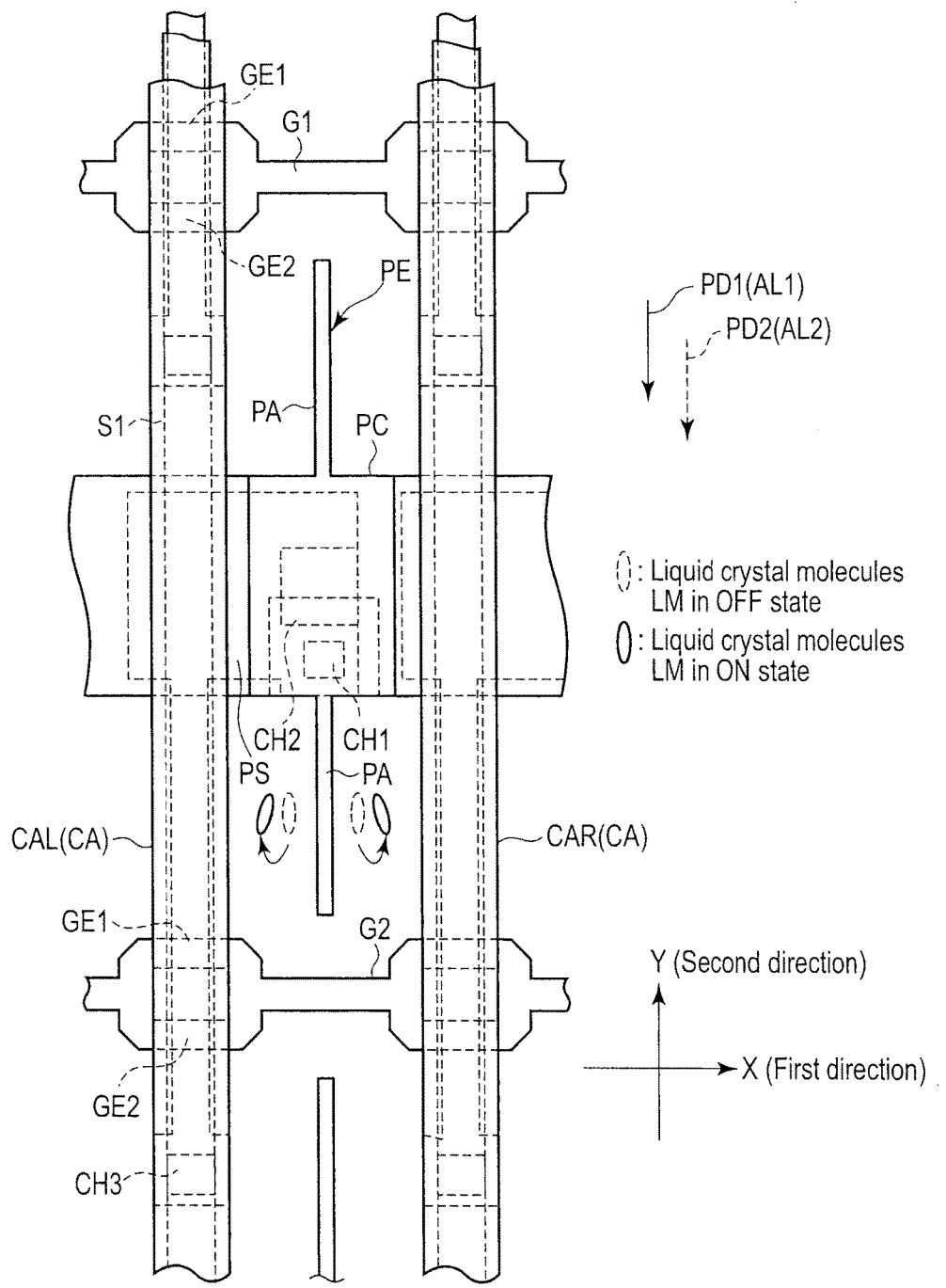
FIG. 9 is a plan view schematically showing another example of structure of one pixel in the liquid crystal display panel shown in FIG. 1 as seen from the counter substrate side.

FIG. 9 is a plan view schematically showing another example of the structure of one pixel in which the liquid crystal display panel LPN shown in FIG. 1 is viewed from the counter substrate.

This structure example is different from the structure example shown in FIG. 7 in that the gate wire G branches at portions of the gate wire G in which the semiconductor layer PS and the gate wire intersect so that the gate wire G and the semiconductor layer PS intersect at a plurality of positions.

That is, according to the present embodiment, the gate wire G branches into a first gate electrode GE1 and a second gate electrode GE2 at the portions of the gate wire G in which the semiconductor layer PS and the gate wire intersect. Thus, in the example shown in FIG. 9, the switching element SW is a dual gate TFT with a plurality of the gate electrodes GE1 and GE2.

The switching element comprising the dual gate TFT as described above allows possible leakage current to be prevented and enables an increase in the withstand voltage of the switching element SW.

That is, the present embodiment enables a decrease in transmittance to be suppressed without degrading the performance of the switching element S. This in turn enables degradation of the display quality to be suppressed.

According to the first embodiment and the second embodiment, the common electrodes CE comprise only the main common electrodes CA. However, the common electrodes CE may comprise, besides the above-described main common electrodes CA, secondary common electrodes extending along the first direction X (not shown in the drawings). In this case, the main common electrodes CA and the secondary common electrodes are integrally or contiguously formed.

Each of the secondary common electrodes is arranged opposite the corresponding one of the gate wires G. Two common electrodes are arranged parallel to each other along the first direction X. For distinction of these secondary common electrodes, the secondary common electrode lying opposite the upper illustrated gate wire G1 is referred to as a secondary common electrode CBU, and the secondary common electrode lying opposite the lower illustrated gate wire G2 is referred to as a secondary common electrode CBB. The secondary common electrode CBU is arranged at the upper end of the pixel PX opposite the gate wire G1. That is, the secondary common electrode CBU is arranged so as to stride across the pixel PX and a pixel located above and adjacent to the pixel PX. Furthermore, the secondary common electrode CBB is arranged at the lower end of the pixel PX opposite the gate wire G2. That is, the secondary common electrode CBB is arranged so as to stride across the pixel PX and a pixel located below and adjacent to the pixel PX. Provision of the secondary common electrodes enables the orientation of the liquid crystal molecules LM to be controlled at high speed.

Furthermore, according to the present embodiment, the common electrodes CE may comprise, besides the main common electrodes CA provided on the counter substrate CT, second main common electrodes provided on the array substrate AR opposite the main common electrodes CA (or opposite the source wires S). The second main common electrodes extend parallel to the main common electrodes CA and have the same potential as that of the main common electrodes CA. Provision of the second main common electrodes enables unwanted electric fields from the source wires S to be shielded.

Additionally, the common electrodes CE may comprise, besides the main common electrodes CA provided on the counter substrate CT, second secondary common electrodes provided on the array substrate AR opposite the gate wires G and the auxiliary capacitance lines C. The second secondary main common electrodes extend in a direction in which the second secondary main common electrodes intersect with the main common electrodes. Moreover, the second secondary main common electrodes have the same potential as the main common electrodes CA. Provision of the second secondary main common electrodes enables unwanted electric fields from the gate wires G and the auxiliary capacitance lines C to be shielded. A configuration comprising the second main common electrodes or the second secondary main common electrodes enables degradation of the display quality to be further prevented.

Figure 10:
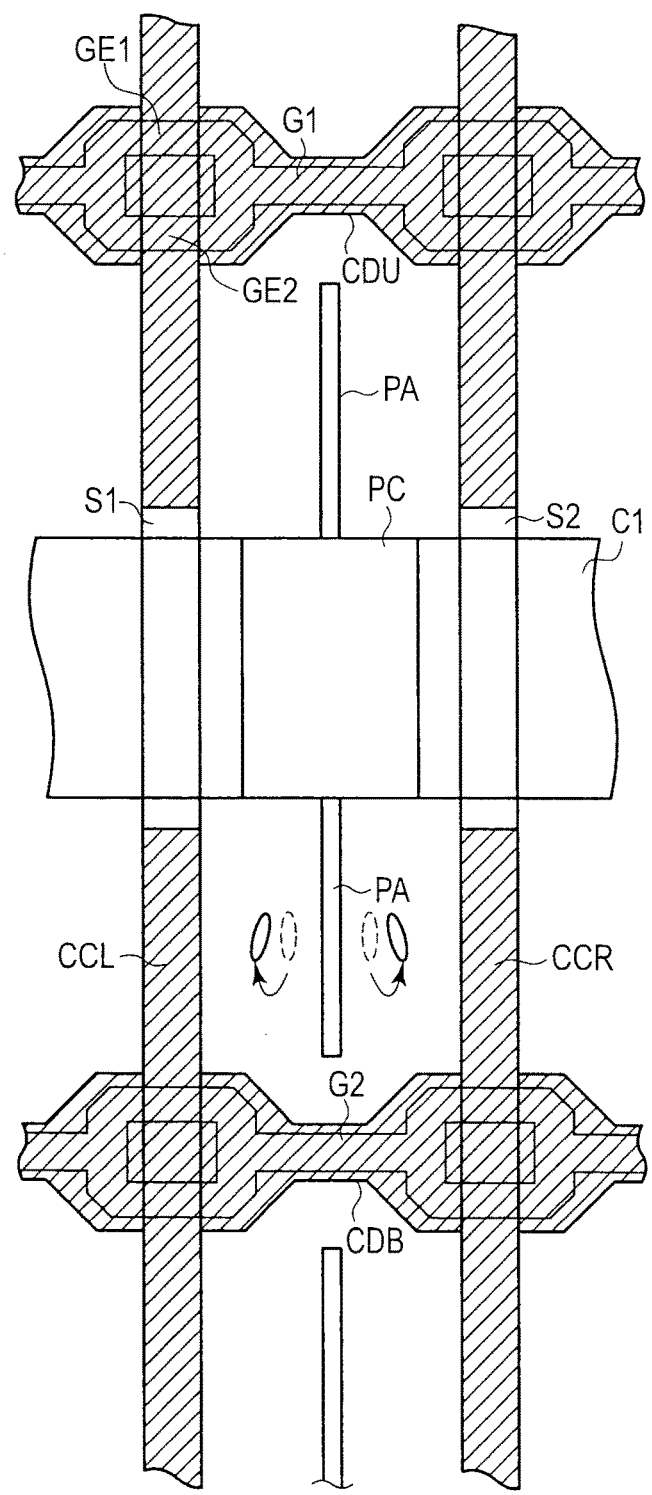
FIG. 10 is a plan view schematically showing another example of structure of one pixel in the liquid crystal display panel provided with a second main common electrode and a second secondary common electrode as seen from the counter substrate side.

FIG. 10 is a plan view schematically showing another example of the structure of one pixel in which the liquid crystal display panel is viewed from the counter substrate if the second main common electrodes and the second secondary main common electrodes are installed in the liquid crystal display panel. FIG. 10 does not show the switching element SW. The gate wire G is configured to branch as shown in FIG. 9. However, the switching element SW is not limited to the dual gate switching element but may have any of the above-described configurations.

This example involves a second main common electrode CCL lying opposite the source wire S1, a second main common electrode CCR lying opposite the source wire S2, a second secondary common electrode CDU lying opposite the gate wire G1, and a second secondary common electrode CDB lying opposite the gate wire G2.

In the case illustrated in FIG. 10, the second main common electrode CCL lying opposite the source wire S1 and the second main common electrode CCR lying opposite the source wire S2 are partly removed at the opposite sides of the contact portion PC of the pixel electrode PE in the first direction X. This is because if the pitch of the pixels PX is reduced as a result of increased definition, the distance between the contact portion PC and each of the second main common electrodes CCL and CCR decreases, possibly leading to a short circuit. In this case, the definition of the liquid crystal display panel LPN can further be increased by dividing each of the second secondary common electrodes CCL and CCR into two pieces in the vicinity of the contact portion PC.

As described above, the present embodiment can provide a liquid crystal display that enables degradation of the display quality to be suppressed.

Several embodiments of the present invention have been described. However, the embodiments are illustrative and are not intended to limit the scope of the present invention. These new embodiments may be implemented in various other forms, and various omissions, substitutions, and changes may be made to the embodiments without departing from the spirits of the invention. The embodiments and variations thereof are included in the scope and spirits of the invention and also in the invention set forth in the claims and equivalents of the invention.

For example, according to the first embodiment and the second embodiment, the array substrate AR comprises the auxiliary capacitance lines C. However, the auxiliary capacitance lines C may be omitted.

FIG. 11 shows the structure according to the first embodiment which comprises no auxiliary capacitance line C. The semiconductor layer PS of the switching element SW extends under the source wire S so as to intersect with the gate wire and bends under the source wire so as to extend to below the contact portion.

As described above, according to the first embodiment and the second embodiment, lateral electric fields are generated between the pixel electrode PE formed on the array substrate AR and the common electrode CE formed on the counter substrate CT. To allow the lateral electric fields to be generated, the distance between the pixel electrode PE and the common electrode CE is set at least twice as large as the thickness of the liquid crystal layer LQ. Thus, according to the first embodiment and the second embodiment, to allow the liquid crystal molecules to respond properly to a driving voltage, the dielectric anisotropy and relative permittivity of the liquid crystal molecules LM forming the liquid crystal layer LQ are set as follows: the dielectric anisotropy $\Delta\in$ is set to a value of between 11 and 21, the relative permittivity $\in //$ is set to a value of between 16 and 24, and the relative permittivity $\in \perp$ is set to a value of between 3 and 5.

Experiments were conducted using the structure according to the first and second embodiments which includes no auxiliary capacitance line C formed therein as well as liquid crystal molecules with the above-described dielectric anisotropy and relative permittivity. Then, proper display quality was achieved.

Even if the auxiliary capacitance lines C are omitted from structure according to the first and second embodiments, a decrease in transmittance and thus degradation of the display quality can be suppressed by arranging the semiconductor layer PS of the switching element SW so that the semiconductor layer PS extends under the source wire S so as to intersect with the gate wire and bends under the source wire so as to extend to below the contact portion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
a first substrate comprising a first insulating substrate, a gate wire extending in a first direction a first source wire extending in a second direction intersecting with the first direction, a pixel electrode with a contact portion and a main pixel electrode extending from the contact portion, and a semiconductor layer arranged under the first source wire and intersecting with the gate wire and bending under the first source wire so as to extend to below the contact portion; and
a second substrate arranged opposite the first substrate;
a liquid crystal layer comprising liquid crystal molecules between the first substrate and the second substrate;
wherein
the semiconductor layer is electrically connected to the first source wire on a first side of a position where the semiconductor layer intersects with the gate wire in the second direction and to the contact portion on a second side of the position,
the contact portion is arranged nearer the gate wire than the main pixel electrode,
the main pixel electrode extends from the contact portion in the second direction and is located nearer the second side than the first side, and
the contact portion is connected to the main pixel electrode only by a first portion of the main pixel electrode.

2. The liquid crystal display according to claim 1, wherein the first substrate further comprises an auxiliary capacitance electrode formed between the first insulating substrate and the pixel electrode, and the contact portion is arranged on the auxiliary capacitance electrode.

3. The liquid crystal display according to claim 2, wherein the auxiliary capacitance electrode comprises an opening formed under the contact portion, and
the semiconductor layer bends at a position where the auxiliary capacitance electrode and the first source wire intersect, so as to extend to below the contact portion, and the semiconductor layer is electrically connected to the contact portion at the opening.

4. The liquid crystal display according to claim 1, wherein the main pixel electrode is formed in a band shape with substantially a constant width in the first direction, and
the contact portion is formed to be wider than the main pixel electrode in the first direction.

5. The liquid crystal display according to claim 4,
the first substrate further comprises a second source wire extending parallel to the first source wire,
the pixel electrode is arranged between the first source wire and the second source wire, and
a first distance between the first source wire and the main pixel electrode in the first direction is substantially equivalent to a second distance between the second source wire and the main pixel electrode in the first direction.

6. The liquid crystal display according to claim 4, wherein
the first substrate further comprises: a first insulating film interposed between the first insulating substrate and the semiconductor layer; and a light blocking layer formed between the first insulating film and the first insulating substrate at a position where the semiconductor layer and the gate wire intersect, and
the light blocking layer is formed to be larger than an area in which the semiconductor layer and the gate wire intersect.

7. The liquid crystal display according to claim 6, wherein
the first substrate further comprises: a second insulating film interposed between the semiconductor layer and the gate wire; a third insulating film interposed between the gate wire and the first source wire; a fourth insulating film interposed between the first source wire and the pixel electrode; a first contact hole formed in the second insulating film and the third insulating film; a drain electrode formed on the third insulating film and electrically connected to the semiconductor layer through the first contact hole; and a second contact hole formed in the fourth insulating film, and
the pixel electrode is formed on the fourth insulating film and electrically connected to the drain electrode through the second contact hole.

* * * * *